United States Patent

Holm

[15] 3,637,015
[45] Jan. 25, 1972

[54] METHOD FOR IMPROVING THE INJECTIVITY OF BRINE INTO WATER INJECTION WELLS

[72] Inventor: Le Roy W. Holm, Fullerton, Calif.

[73] Assignee: Union Oil Company of California, Los Angeles, Calif.

[22] Filed: Apr. 20, 1970

[21] Appl. No.: 30,240

[52] U.S. Cl. ..................................................166/273
[51] Int. Cl. ..........................................E21b 43/22
[58] Field of Search ..........................166/273–275

[56] References Cited

UNITED STATES PATENTS

| 3,557,873 | 1/1971 | Owens | 166/274 |
| 2,738,325 | 3/1956 | Rydell | 166/275 |
| 3,297,085 | 1/1967 | Herring | 166/273 |
| 3,460,622 | 8/1969 | Davis | 166/273 X |
| 3,467,188 | 9/1969 | Gogarty | 166/274 |
| 3,474,865 | 10/1969 | Gogarty et al. | 166/275 X |
| 3,482,631 | 12/1969 | Jones | 166/273 |
| 3,500,922 | 3/1970 | O'Brien et al. | 166/273 |

*Primary Examiner*—Ian A. Calvert
*Attorney*—Milton W. Lee, Richard C. Hartman, Lannas S. Henderson, Dean Sandford and Robert E. Strauss

[57] ABSTRACT

The injection rate of brine into an injection well that exhibits low injectivity because of oil saturation in the formation adjacent to the well can be increased by introducing a small quantity of substantially anhydrous soluble oil into the well, then introducing low-salt-content fresh water, and thereafter displacing the soluble oil into the formation with subsequently injected brine. This treatment substantially reduces the oil saturation of the formation adjacent to the well, thereby increasing the relative permeability of the formation to brine.

10 Claims, No Drawings

METHOD FOR IMPROVING THE INJECTIVITY OF BRINE INTO WATER INJECTION WELLS

This invention relates to the recovery of oil from subterranean reservoirs by a waterflood process. More specifically, this invention relates to improving the injection rate of brine into input wells in a waterflood process.

It has long been recognized that substantial amounts of oil remain unrecovered at the completion of normal primary recovery operations. In order to improve the recovery of oil, it is common practice to supplement the native reservoir energy by various means including the use of water to displace oil from a formation, which process is conventionally called waterflooding. A waterflood process, briefly, comprises introducing water, such as an oil field brine or other high salt content water, into a formation through at least one input well, forcing the water through the formation toward at least one output well, and recovering through the output well the oil that is displaced from the formation by the water. Oil field brines are often employed as the flooding media because of their compatibility with the reservoir rock and with the reservoir fluids, and their availability at the injection site.

One of the principal problems encountered in waterflooding is the economical injection of a sufficient quantity of water to carry out the process. Reduced water injectivity can be caused by the presence of oil in the formation around the input well. A condition of oil saturation in porous rock material substantially reduces the effective permeability of the rock to the flow of water, necessitating increased injection pressures to force the water into the formation. The higher pressure not only increases the cost of injecting water, but in many fields the injection rates are limited because of pressure limitations of the well casings or because the fracturing pressure of the formation cannot be exceeded.

It has heretofore been proposed to increase the permeability of the formation around the well to water by reducing the oil saturation of the formation. Specifically, it has been proposed that oil saturation be reduced by injecting solvents such as carbon dioxide, acetone, ethyl alcohol, isopropyl alcohol, n-propyl alcohol, alkyl alcohol, diacetone alcohol, butyl cellosolve, butyl carbitol, dioxane, liquid ammonia and alternate slugs of liquid hydrocarbon and liquid ammonia. While these solvents are more or less effective in reducing oil saturation in the formation, excessive quantities of solvent are required to remove a substantial amount of the oil. Also, many of the suggested solvents are expensive.

It has also been proposed to reduce oil saturation in the formation adjacent to an injection well by treating the well with soluble oils or micellar dispersions formed by adding water to a soluble oil. While such treatments have been successful in improving the injectivity of wells used for the injection of relatively fresh water, i.e., water low in salt content, and particularly water having a low content of polyvalent cations, these treatments have not been as successful in improving injection rates in wells used for the injection of brine, such as the typical oil field brines employed in many water flooding operations. Hence, need exists for a simple inexpensive method for treating a formation adjacent to a brine injection well to substantially completely remove oil therefrom.

Accordingly, a principal object of the present invention is to improve the injectivity of an input well used for the injection of brine in a water-flooding process. Another object of the invention is to provide a process for reducing the oil saturation in that portion of an oil-bearing formation surrounding a well used for brine injection. A still further object of this invention is to provide a simple, inexpensive method for substantially completely removing oil from the formation adjacent to a brine injection well. Other objects and advantages of the invention will be apparent from the following description.

Briefly, this invention contemplates a process for improving the injectivity of brine into a subterranean oil-bearing formation by reducing the oil saturation in that part of the formation immediately surrounding the well. Oil removal is accomplished by introducing a small amount of a substantially anhydrous soluble oil into the well, then introducing into the well a volume of low salt content fresh water, and thereafter displacing the soluble oil and fresh water outwardly from the well into the formation by the subsequent injection of brine.

Because of the radial flow system involved in injecting fluids from a well outwardly into a surrounding permeable formation, that portion of the formation immediately adjacent to the well is most critical with respect to restricting the rate of injection of fluid into the formation. Hence, the restriction on the flow of water from the well into the formation due to oil blockage can be substantially reduced by removing oil from only that portion of the formation immediately adjacent to the well. Oil blockage can be effectively minimized by removing oil from the strata of the formation into which water is to be injected to a distance of 5 to 10 feet from the wall.

Oil can be removed from an oil-bearing formation by displacement with water or brine down to a residual oil saturation of about 20 to 35 pore volume percent, but cannot be removed below this residual saturation of water displacement alone. Residual oil can be substantially completely removed from the formation adjacent to the well by placing a small amount of soluble oil in the well, and subsequently injecting flood water to displace the soluble oil outwardly into the formation. By the term "substantially completely removed," as used herein, it is meant that almost all of the residual oil is removed from the formation adjacent to the well. More specifically, it is preferred that the oil content of the formation adjacent to the well be reduced to less than about 5 percent of the pore volume, and more preferably, to less than about 3 percent. Because of the high solvency of the soluble oil for the connate oil, the formation adjacent to the well can be substantially denuded of oil by displacing only a small quantity of soluble oil therethrough.

The well stimulation process of this invention has particular utility in improving the injectivity of brine into oil-bearing subterranean formations. The term "brine" as used herein is meant to include both oil field and synthetic aqueous salt solutions that contain a high concentration of dissolved salts. Oilfield and synthetic brines that contain a high content of the salts of polyvalent metals, and in particular those that contain more than about 300 p.p.m. of polyvalent cations; such as the cations of calcium, magnesium, iron, aluminum, copper, zinc, manganese, and the like, are especially deleterious and adversely affect the ability of the soluble oil to displace oil from the formation. Also, brines containing a relatively high content of other dissolved salts, such as the salts of monovalent metals, e.g., sodium and potassium, are deleterious, even though the polyvalent cations are present in an amount less than 300 p.p.m. Thus, the process of this invention has particular utility in improving the injectivity of brines containing more than about 1.0 weight percent total dissolved salts, and/or more than about 300 p.p.m. polyvalent cations.

In the practice of this invention, a small amount of soluble oil is introduced into the well and followed by the introduction of fresh water containing less than about 1.0 weight percent total dissolved salts and less than about 200 p.p.m. polyvalent cations. More preferably, a fresh water is employed that contains less than 0.5 weight percent total dissolved salts and less than 150 p.p.m. polyvalent cations. However, where the formation into which these fluids are injected is sensitive to fresh water, the fresh water can contain up to about 1.0 weight percent monovalent salts, such as the salts of sodium and potassium, providing that the concentration of polyvalent cations is maintained below about 200 p.p.m. After the soluble oil and the fresh water are introduced into the well, brine is injected to displace these fluids from the well outwardly into the formation.

The soluble oil is introduced into the well in an amount not greater than about 3 barrels of soluble oil per foot of vertical thickness of the reservoir, and thereafter about 2 to 5 volumes of fresh water per volume of soluble oil is introduced into the well. More particularly, the soluble oil is employed in the amount of about 0.1 to 3 barrels of soluble oil per foot of vertical thickness of the reservoir, and preferably in an amount equivalent to about 0.5 to 2 barrels per foot of vertical thickness.

The soluble oils used herein are oleaginous compositions which are miscible with the connate oil and have the ability to spontaneously emulsify with water when admixed therewith. These soluble oils comprise a liquid hydrocarbon, one or more selected surface active agents, and optionally, a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they contain color bodies. It is recognized, of course, that some cloudiness may appear at certain water concentrations without adversely effecting the utility of the microemulsion in removing oil from that portion of the formation which it contacts. Emulsions of this type are designated microemulsions to distinguish them from ordinary water-in-oil macroemulsions in which the lower limit in the size of the water droplets is about 0.1 micron. At water concentrations above the inversion concentration, the emulsion inverts to an emulsion of the oil-in-water type in which droplets of oil are dispersed in a continuous water phase. In most soluble oil systems, the water concentrations employed in the practice of this invention are substantially below the inversion concentration.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semirefined petroleum product, such as gasoline, naphtha, stove oil and diesel; a residual product obtained by the distillation of lower boiling fractions from a crude oil, such as bunker fuel oil and other residual products; a low value refinery byproduct, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or nonpolar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl monosulfonate or mixture of monosulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid, or sulfur trioxide, followed by neutralization to form the sulfonates. Upon sulfonation, two types of general products are formed which are designated mahogany acid and green acid. The terminology is based on the colors imparted to the respective oil and water phases produced in the sulfonation process, a brownish color being imparted to the respective oil and water phases produced in the sulfonation process, a brownish color being imparted to the oil phase by oil-soluble sulfonic acids and a greenish color being imparted to the aqueous phase by the water-soluble sulfonic acids. The mahogany acids and the green acids can be neutralized to form mahogany sulfonates and green sulfonates.

The mahogany sulfonates are alkyl aryl sulfonates which usually contain only one sulfonic group per molecule and both the green and the mahogany types contain mixtures of sulfonates of varying oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. Although the optimum surfactant combination is dependent upon the characteristics of the particular reservoir, in many operations it is found the superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl ethers. Specific agents found particularly useful include isopropyl alcohol, secondary butyl alcohol, methyl ethyl ketone, glycol monoethyl ether, (cellosolve), glycol monobutyl ether (butyl cellosolve), and diethylene glycol monobutyl ether (butyl carbitol).

The soluble oils employed in the practice of this invention are substantially anhydrous in that they contain little, if any, added water. However it is well known that some of the ingredients from which soluble oils are compounded, such as the hydrocarbon, the stabilizing agent and the petroleum sulfonates, can contain minor proportions of water and that it is difficult and costly to dehydrate these agents to remove all traces of water. Also, it may be advantageous when compounding the soluble oil to add a small amount of water to the composition. Thus, it is within the scope of this invention to use anhydrous and substantially anhydrous soluble oils in the practice of the invention. The term "substantially anhydrous" as used herein is meant to include soluble oils having not more than minor amounts of water. More particularly, these soluble oils contain less than 10 volume percent water. The substantially anhydrous soluble oils useful in the practice of this invention are to be distinguished from the prior art microemulsions and micellar solutions containing substantial quantities of water, such as from about 10 to 50 percent or more water.

A preferred composition in accordance with this invention useful in removing oil from the formation comprises a mixture of about 52 to 90 volume percent liquid hydrocarbon, such as crude petroleum or other hydrocarbon; 4 to 30 volume percent of a surface active material, such as alkyl aryl monosulfonate obtained by sulfonation of an aromatic petroleum fraction; 0.5 to 8 volume percent stabilizer; and less than about 10 volume percent water. Also, where the hydrocarbon liquid has a relatively high viscosity, light liquid hydrocarbon can be added to reduce the viscosity of the resulting soluble oil so that it can be more easily displaced into the formation. The light hydrocarbon will usually not constitute more than 25 volume percent of the resulting soluble oil.

The compositions useful in the practice of this invention can be prepared by any of the conventional techniques. One suitable method of preparing these compositions is to first admix the hydrocarbon base stock, surface active material and stabilizer in the desired proportions to form a substantially anhydrous soluble oil. Thereafter, if desired, a small amount of water is added to obtain a microemulsion of the desired water content. Preferably, the water employed in forming the microemulsion is a salt-containing fresh water having a dissolved salt content of less than about 5,000 p.p.m.

In the practice of this invention, the soluble oil composition can be injected into the well either preceding a waterflood, or flood water injection can be interrupted and the soluble oil introduced into the well at any time during the waterflood that it is desired to increase flood water injectivity. In the case where a well is first converted to water injection service, it is the usual practice to initiate flood water injection to establish injection profiles and rates. If necessary, water injection is discontinued and the soluble oil treatment initiated. Also, it is usually advantageous to backflow the well to remove loose scale and other deleterious material, and to inject sufficient fresh water prior to the soluble oil treatment to flush brine from the well. Thereafter, a quantity of soluble oil preferably amounting to not more than about 3 barrels per foot of vertical thickness of the zone to be waterflooded is introduced into the well, followed by the introduction of 2 to 5 volumes of fresh water per volume of soluble oil. Brine injection is then resumed to displace the soluble oil from the well outwardly into the formation. Where the water injection has been inhibited by oil blockage in the formation adjacent to the well, this step will be accompanied by an immediate reduction in injection pressure, or a corresponding increase in injection rate.

It has been found that the introduction of fresh water into the well immediately following the soluble oil enhances the effectiveness of the soluble in removing oil and oily substances from the formation surrounding the well bore. Also, it has been found that this procedure allows the use of less costly soluble oils containing lower concentrations of sulfonate and stabilizing agent. Thus, not only is the effectiveness of the well treatment improved, also the treating cost is reduced.

The invention is further described by the following examples which are illustrative of specific modes of practicing the invention and are not intended as limiting the scope of the invention as defined by the appended claims.

EXAMPLE 1

The improvement in water permeability obtainable by treating an oil-containing porous earth formation by the method of this invention is illustrated by the following laboratory test.

Two 4-inch long Boise sandstone cores are saturated with crude oil and then flooded with brine to residual oil saturations of 31 and 29 percent, respectively. The brine used in these tests contains 9.4 weight percent total dissolved salts and 6,000 p.p.m. polyvalent cations. The oil saturated cores exhibit permeabilities to brine of 344 and 290 millidarcies, respectively.

A first core is treated by injecting 0.2 pore volume of soluble oil of the following composition:

| | Volume Percent |
|---|---|
| Crude oil | 75.0 |
| Mixed alkyl aryl sulfonates[1] | 19.1 |
| Butyl Cellosolve | 1.9 |
| Water | 4.0 |

[1] Contains 43 weight percent active sulfonates.

Next, 2.0 pore volumes of brine is passed through the core, and the residual oil content and permeability determined. Oil saturation is reduced to 14.5 percent and the permeability increased to 639 millidarcies, which represents a permeability increase of 86 percent A second core is treated by injecting 0.2 pore volumes of soluble oil of the above composition, followed by 0.8 pore volume of fresh water containing 0.07 weight percent total dissolved salts and 115 p.p.m. of polyvalent cations, and then by 1.2 pore volumes of brine. Oil saturation is reduced to 2.5 percent and the permeability is increased to 1,485 millidarcies, which represents a permeability increase of 410 percent. These results are summarized in Table 1.

TABLE 1

| | Test No. 1 | Test No. 2 |
|---|---|---|
| Initial oil saturation, % P.V. | 31 | 29 |
| Final oil saturation, % P.V. | 14.5 | 2.5 |
| Initial permeability, md. | 344 | 290 |
| Final permeability, md. | 639 | 1485 |
| Permeability Increase, % | 86 | 410 |

EXAMPLE 2

EXAMPLE 2

A brine injection well is treated in accordance with the method of this invention. The well is completed in an oil reservoir having a vertical thickness of 9 feet, and serves as an injection well in a water flooding operation. The brine employed in the flooding operation has 9.3 weight percent total dissolved salts, and 6,000 p.p.m. polyvalent cations. The maximum brine injection rate prior to treatment is 195 barrels per day at 750 p.s.i.g. surface pressure.

Brine injection is discontinued and 12 barrels of soluble oil introduced into the well, which is equivalent to a treatment of 1.3 barrels per foot of vertical thickness of the formation. The soluble oil has the following composition:

| | Volume Percent |
|---|---|
| Crude oil | 75.0 |
| Mixed alkyl aryl sulfonates[1] | 19.1 |
| Butyl cellosolve | 1.9 |
| Water | 4.0 |

[1] Contains 43 weight percent active sulfonates.

Next, 40 barrels of fresh water containing 350 p.p.m. total dissolved salts and 70 p.p.m. polyvalent cations is introduced into the well, and brine injection resumed. The brine injection rate stabilized at 370 barrels per day at 750 p.s.i.g. surface pressure, which amounts to an increase of approximately 90 percent.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method of recovering oil from a subterranean reservoir wherein brine is injected into the reservoir through an injection well and oil is recovered from at least one production well spaced apart in the reservoir from the injection well, and wherein the injection of said brine is restricted by the presence of oil in the reservoir adjacent to the injection well, the improvement which comprises discontinuing the injection of brine and introducing a substantially anhydrous soluble oil into the injection well in an amount not greater than about 3 barrels of soluble oil per foot of vertical thickness of said reservoir, next introducing into said well about 2 to 5 volumes of fresh water per volume of said soluble oil, and thereafter resuming the injection of brine.

2. The method defined in claim 1 wherein said soluble oil is comprised of a major proportion of crude oil, amounts of alkyl aryl sulfonate and partially oxygenated organic liquid stabilizing agent effective to form stable emulsions on the addition of water to the soluble oil, and not more than about 10 volume percent water.

3. The method defined in claim 1 wherein said soluble oil is comprised of about 52 to 90 volume percent liquid hydrocarbon, about 4 to 30 volume percent of petroleum sulfonates, about 0.5 to 8 volume percent of partially oxygenated organic liquid stabilizing agent, and less than about 10 volume percent water.

4. The method defined in claim 1 wherein said brine contains more than about 1.0 weight percent total dissolved salts.

5. The method defined in claim 1 wherein said brine contains more than about 300 p.p.m. polyvalent cations.

6. The method defined in claim 1 wherein said fresh water contains less than about 1.0 weight percent total dissolved salts and less than about 200 p.p.m. polyvalent cations.

7. In the injection of brine that contains more than about 1.0 weight percent total dissolved salts and/or more than about 300 p.p.m. polyvalent cations through an injection well and into a porous subterranean formation containing oil that is resistant to displacement by said brine and that restricts the flow of brine from the well into the formation, the improvement which comprises introducing into said well about 0.1 to 3 barrels of substantially anhydrous soluble oil per foot of vertical thickness of said formation; next introducing into said well about 2 to 5 volumes of fresh water per volume of said soluble oil, said fresh water containing less than about 1.0 weight percent total dissolved salts and less than about 200 p.p.m. of polyvalent cations; and thereafter injecting said brine through said well and into said formation.

8. A method for increasing the injection rate of brine into a porous subterranean oil-bearing reservoir penetrated by an injection well wherein the flow of brine into the reservoir is restricted by residual oil in the reservoir immediately surrounding the injection well, which comprises:

introducing into said well between about 0.1 to 3 barrels of substantially anhydrous soluble oil per foot of vertical thickness of said reservoir, said soluble oil comprising about 52 to 90 volume percent liquid hydrocarbons, about 4 to 30 volume percent alkyl aryl sulfonates, about 0.5 to 8 volume percent of partially oxygenated organic liquid stabilizing agent, and less than about 10 volume percent water;

next introducing into said well about 2 to 5 volumes of fresh water per volume of said soluble oil, said fresh water containing less than about 0.5 weight percent total dissolved salts and less than about 150 p.p.m. of polyvalent cations;

thereafter injecting brine containing more than about 1.0 weight percent total dissolved salts and/or more than about 300 p.p.m. of polyvalent cations into said reservoir through said well.

9. A method for improving the injectivity of brine into a porous subterranean oil-bearing formation penetrated by an injection well, which comprises:

injecting brine containing more than about 1.0 weight percent total dissolved salts and/or more than about 300 p.p.m. polyvalent cations through said injection well and into said formation at a first injection rate;

discontinuing the injection of said brine;

introducing a small volume of substantially anhydrous soluble oil into the well;

next introducing into the well about 2 to 5 volumes of fresh water per volume of said soluble oil, said fresh water containing less than about 1.0 total dissolved salts and less than about 200 p.p.m. polyvalent cations; and
thereafter injection said brine at an injection rate higher than said first injection rate.

10. The method defined in claim 9 wherein said soluble oil is injected in an amount between about 1.0 and 3 barrels per foot of vertical thickness of said formation.

* * * * *

UNITED STATES PATENT OFFICE
CERTIFICATE OF CORRECTION

Patent No. 3,637,015          Dated January 25, 1972

Inventor(s) LeRoy W. Holm

It is certified that error appears in the above-identified patent and that said Letters Patent are hereby corrected as shown below:

Column 9, line 5, the word -- injection -- in the first instant, should be -- injected --.

Column 10, line 3, -- 1.0 -- should be -- 0.1 --.

Signed and sealed this 3rd day of October 1972.

(SEAL)
Attest:

EDWARD M. FLETCHER, JR.          ROBERT GOTTSCHALK
Attesting Officer          Commissioner of Patents